3,347,688
PROTEIN ADHESIVE AND METHOD OF PREPARATION

John W. Frankenfeld, Atlantic Highlands, and Carleton J. McCoy, Linden, N.J., assignors to Esso Research and Engineering Company, a corporation of Delaware
No Drawing. Filed July 27, 1964, Ser. No. 385,496
11 Claims. (Cl. 106—124)

This invention is directed to novel high-protein containing adhesives obtained from microorganism cells capable of growing on hydrocarbon feeds, and the method of preparing said adhesives.

More specifically this invention is directed to novel high bacterial protein containing adhesives and paper coating binders obtained from *Micrococcus cerificans* cells by lysing the cells, conducting a basic extraction on the lysed cells and isoelectrically precipitating the extracted protein by adjusting the pH in acidic medium. The precipitated protein curd is collected by centrifugation, washed with water and dried. The material thus obtained is then formulated for use as an adhesive composition, especially as a paper coating binder.

Currently in the paper coating industry, two adhesives are employed on a wide-spread basis. These are casein adhesives (derived from milk) and soy adhesives (derived from soy beans) and commonly referred to as "alpha-protein." As between casein and soy paper coating binders, casein has better optical and adhesive properties, but poorer storage properties (self life). Both casein and soy adhesives suffer from inconsistencies in maintaining their adhesive, optical, and storage properties. Consequently, it is difficult for a manufacturer of paper products to maintain consistently good quality control when using either casein or soy adhesives.

The soy adhesives differ in properties largely dependent upon the year-to-year crop variations in soy beans. The casein adhesives frequently differ in properties due to the fact that most casein adhesives currently in use are purchases from various suppliers outside of the United States.

Therefore, there is a real need in the paper coating industry for a low cost, strong paper coating adhesive having uniform adhesive and optical properties combined with superior water resistance and reasonably satisfactory storage properties. This combination of desirable properties is even more valuable when, as occurs with the protein adhesives of this invention, these adhesive properties are maintained even when the composition is diluted to a large extent with inert filler materials. In this latter regard the adhesive compositions of this invention are clearly superior to both soy and casein adhesives. This is an economically important advantage because it means that less protein adhesive can be employed to achieve a given extent of adhesion thus enabling reductions in the overall cost of the adhesive necessary to obtain that extent of adhesion.

The bacterial-derived protein paper coating binders and adhesives of this invention provide a valuable combination of the above mentioned desirable properties and quite importantly uniformity of these properties from batch to batch. Thus the bacterial protein-derived paper coating binders and adhesives of this invention are not subject to seasonal or crop variances, nor are they subject to variances depending upon the source of supply. This ability to uniformly produce paper coating binders and adhesive compositions of high uniformity is attributable to a combination of factors including among other things the genetic stability of the *Micrococcus cerificans* bacteria cells, and the highly controlled nature of the extraction and precipitation procedure whereby the protein adhesive is produced from the *Micrococcus cerificans* cells.

The gram negative bacteria whose use is contemplated herein in the preparation of the novel bacterial protein derived adhesives are *Micrococcus cerificans*. *Micrococcus cerificans* was first isolated and identified by Dr. R. E. Kallio et al., Journal of Bacteriology, vol. 78, No. 3, pages 441 to 448 (September 1959). Cultures of this mircoorganism have been deposited in the American Type Culture Collection, 212 M Street, NW., Washington, D.C., as No. 14987. The full identification of this material is as follows:

Morphology: Cells are small, spherical, tending to be elliptical in old cultures and in media high in nitrogen. Cells from defined media average 0.5 to $1.0\mu$ in diameter, from complex media cell diameters 1.0 to $2.0\mu$. Cells occur singly or in clumps. Immotile, Metachromatic granules and sudanophilic granules are not observed.

Gram reaction: Negative.

Colonies on defined agar are small (1 mm.), circular, convex, having entire edge. Colonies on nutrient agar are larger (2 to 5 mm.), raised mucoid, generally round.

Pigmentation: White, beige or tan variants occur.

Obligately aerobic: Wide variety of materials supports growth, yeast extract, casein hydrolyzate, long-chain alcohols and acids, long-chain normal alkanes and olefins.

Carbohydrate fermentation: No carbohydrates are fermented. Aerobically, many carbohydrates are assimilated. These include glucose, maltose, mannitol, sucrose, lactose, arabinose, rhamnose, sorbitol, duleitol, and inulin. Aerobically glucose is utilized with acid production. Gluconic acid has been identified.

Nitrate reduction: Negative.

Gelatin liquefaction: Generally negative. Slow liquefaction may occur in some strains.

Urea hydrolysis: Positive. Catalase is produced. Hydrogen is not utilized. Optimal temperature is 25° C. Optimal growth pH is 7.0 to 8.5.

Source: Iowa soil.

Habitat: Soils.

While the above bacteria (A.T.C.C. No. 14987) have been classified as "*Micrococcus cerificans*" by Dr. Kallio, more recent experimental information acquired in the laboratories of the present inventors indicate that a more proper designation would be *Arthobacter ureafaciens*. The following test results indicate the basis of the above conclusion.

| Micrococcus | A.T.C.C. No. 14987 | Arthobacter |
|---|---|---|
| Always gram positive early in fermentation. | Always gram negative | Gram negative or variable. |
| Cells in irregular masses | Like Arthobacter | Short filament formation. |
| Never change size | do | May occur with some rudimentary budding. |
| Never occur in a rod state | do | Larger than usual coccoidal cells may appear at times. Large coccoidal cells give rise to rod shaped cells. |
| Carbohydrates frequently fermented. | do | Little or no acid from carbohydrates. |

While the present inventors believe *Arthobacter ureafaciens* to be a more proper designation for A.T.C.C. No. 14987, nevertheless the nomenclature *Micrococcus cerificans* is employed herein due to its earlier use by Dr. Kallio.

The *Micrococcus cerificans* bacterial cells can be grown in any convenient manner.

The *Micrococcus cerificans* bacteria cells are grown and harvested by supplying a mixture of 1 to 10 weight percent of a $C_{11}$ to $C_{30}$ paraffinic petroleum feed in an inorganic salt growth medium containing air (or other oxygen containing gas) and water to a stirred reactor inoculated with *Micrococcus cerificans* and removing an effluent stream containing a mixture of bacteria, aqueous medium, and unconverted petroleum feed. Then the bacteria cells are separated from the effluent stream, e.g., by centrifugation and dried. The reactor residence time usually ranges between 1 to 3 hours, and the amount of oxygen supplied usually ranges from 1.5 to 2.5 pounds per pound of product dried bacteria recovered per unit time.

Instead of employing a mixture of n-paraffins having from 11 to 30 carbon atoms, a single n-paraffin within this carbon number range can be used, e.g. n-hexadecane. The n-hexadecane used can be commercial n-hexadecane containing anywhere from 0.05 to 10.0 weight percent of n-olefins.

Usually the inorganic salts aqueous growth medium is supplied in the following amounts; in each case the weight percent salt supplied is based on the product dried bacteria recovered per unit time: 0.05 to 0.25 weight percent $H_3PO_4$, 0.025 to 0.05 weight percent $Na_2SO_4$, 0.05 to 0.10 weight percent KCl, 0.02 to 0.05 weight percent $MgSO_4$, 0.02 to 0.05 weight percent $CaCl_2$, 0.005 to 0.02 weight percent $FeSO_4$ and 0.005 to 0.02 weight percent $MnSO_4$.

The *Micrococcus cerificans* cells whose use is contemplated herein can likewise serve as a food or feed supplement for animals and/or humans so that a combined feed and adhesive process can be undertaken wherein a portion of the cells can be used for making adhesives and the remainder used for food. In such a combined process, where some of the harvested cells are to be used as feed; it is preferable to exclude both polycyclic and monocyclic aromatic compounds from the hydrocarbon feed used to supply the carbon for bacterial cell growth. A satisfactory way of removing aromatics is by use of a molecular sieve removal process as described in U.S. Patent 3,070,542. The use of such a molecular sieve removal of aromatics is indicated in such a combined food-adhesive process when the hydrocarbon is a mixture of paraffins containing polycyclic and/or monocyclic aromatics, e.g. gas oils having from $C_{11}$ to $C_{30}$ carbon atoms. Of course, aromatics need not be removed when adhesives only are prepared from the bacterial cells unless there is a possibility that the bacterial protein extract adhesive compositions will be consumed by humans, e.g. in the case of envelope glues. In such a case it is preferably to remove aromatics from the hydrocarbon feed on which the bacteria cells are grown. In other cases, however, where the likelihood of human consumption is not present; the hydrocarbon feedstock for the bacteria growth need not be purged of aromatics when the bacteria cells are extracted for use as adhesives.

The requisite nitrogen for bacterial cell growth can be supplied as a salt, ammonia, ammonia salt, or ammonium hydroxide. Usually, the nitrogen is supplied in the form of ammonium hydroxide in amounts of from 0.08 to 0.20 grams of nitrogen per gram of dried cells produced.

The temperature of the culture can be varied from about 20 to 45° C., and the pH is controlled at from 6.5 to 7.5 with the preferred growth pH being approximately 7.0.

The harvested cells can be recovered by centrifugation followed by drying (if desired), but neither centrifugation nor drying is required as the subsequent operations (lysing, basic extraction and isoelectric precipitation) can be carried out directly on a concentrated aqueous slurry of the *Mircococcus cerificans* cells, e.g. as obtained by allowing the aqueous product stream from the fermentation tank to settle in a settling tank to obtain a concentrated aqueous slurry having from about 2 to about 12 weight percent cells. However, any suitable recovery procedure can be employed to gain the harvested cells from the aqueous slurry in which they are grown. Examples of other methods of winning the harvested cells are filtration, settling, with or without filter aids or coagulants, etc. The cells need not be rendered non-viable prior to extraction of the protein therefrom.

The recovered cells are then subjected to a lysing operation. Lysing can be accomplished by grinding the cells or by subjecting a concentrated aqueous slurry of cells to heat or supersonic waves or by contact for several hours with aqueous acetone. Usually, however, the harvested *Micrococcus cerificans* cells are lysed by contact with aqueous acetone for time periods ranging from 1 to 5 hours, and usually 2 to 4 hours at ambient room temperatures, e.g. from 65 to 80° F. The term "aqueous acetone" as used herein includes water-acetone mixtures or solutions containing from 85 to 95 weight percent acetone, the remainder being water (either tap water or distilled water).

The lysed cells are then extracted with an aqueous basic solution to remove the protein from the remainder of the cell. The basic extraction can be conducted using any suitable base, e.g. sodium hydroxide, potassium hydroxide, sodium sulfite, "Borax," ammonium acetate, etc. The normality of the aqueous base solution can range from 0.05 to 5.0 N, usually ranges from 0.1 to 1.0 N, and preferably ranges from 0.1 to 0.5 N. The basic extraction can be accomplished at pH values ranging from 8 to 12, usually ranging from 9 to 11, and preferably at a pH of approximately 9.5 to 10.5. The basic extraction is conducted at temperatures ranging from 20° C. to 40° C., usually from 22° C. to 35° C., and preferably from 25° C. to 29° C. for time periods of from about 0.5 to 10 hours, usually 1 to 6 hours, and preferably from 2 to 4 hours. Then the extracted protein is subjected to centrifugation to remove insoluble debris present in the extract. The insoluble debris by-product contains 9 to 11 percent by weight nitrogen and can be used as by-product feed for animals.

After removal of the insoluble debris by centrifugation, filtration (or any other suitable removal technique), the extracted protein is isoelectrically precipitated by adjusting the pH of the basic extract to an acidic pH ranging from 5.2 to 3.2, usually from 4.5 to 3.8, and preferably to an acid pH of approximately 4.1 using any suitable acid. Suitable exemplary acids for isoelectric precipitation of the base extracted bacterial protein include, but are not limited to, the following: sulfuric acid, sulfurous acid, phosphoric acid, hydrochloric acid, etc. The normality of the acid used for precipitation usually ranges from 2 to 10 N and preferably from 4 to 6 N, but an acid of any normality can be used to adjust the pH to the above mentioned level.

The precipitated protein curd is then collected by centrifugation, washed with water and then dried. Any convenient drying procedure can be employed, e.g., a drum-type drier or spray drier can be used. Alternatively, the precipitated protein curd can be dried by slurrying in acetone followed by air drying at temperatures of 25 to 32° C. Yields of 35 to 55 percent of usable protein extract are uniformly realized (based upon dried cell weights). Of course, the exact yield of usable protein extract obtained will depend in part upon the protein content of the original harvested *Micrococcus cerificans* cells.

The material obtained by the above mentioned lysing, basic extraction, and isoelectric precipitation procedures is a high-protein containing material having a protein concentration ranging from 85 to 97 weight percent protein, usually 88 to 95 weight percent protein, and preferably contains 89+ weight percent pure protein.

A typical analysis (moisture-free basis) of the dried protein extract obtained in the manner set forth hereinabove from harvested *Micrococcus cerificans* bacteria cells is as follows:

C=46–48%; H=6.5–7.8%; N=13.9–14.9%; ash=1–5%; protein*=87.93%; moisture=9–10%; acidity=2–3%.

*The percent protein is calculated in the customary manner, viz., by multiplying the percent by weight of nitrogen (determined by the Kjeldahl method) by 6.31.

The physical properties of a typical sample of protein extracted from *Micrococcus cerificans* cells are tabulated hereinbelow:

| Properties: | Value |
|---|---|
| Total nitrogen (percent by weight) | 14.4±0.5 |
| Moisture content (percent by weight water) | 9.5±0.5 |
| Alkali requirement to solubilize protein extract (grams of sodium hydroxide per 100 grams of protein extract) | 4.7±0.8 |
| Free acidity (mills of 0.1 N sodium hydroxide/gram to neutralize) | 0.5±0.1 |

The dried bacteria protein extract is then formulated into an adhesive solution or suspension in order to be readily coated, sprayed, flowed, screened or otherwise deposited upon the paper, wood, or other surface for which it is to be employed as a binder or adhesive.

Usually when the *Micrococcus cerificans* bacteria derived protein adhesive compositions of this invention are to be employed as adhesive binders and coating agents for cellulosic products, e.g. paper, wood, etc.; water is employed as the coating vehicle (solvent or dispersion medium). For such uses the coating solution can contain from 2 to 50% by weight of *Micrococcus cerificans* cell protein extract, usually from 3 to 30% by weight thereof and preferably from about 4 to 25% by weight (based on total solution) of *Micrococcus cerificans* cell protein extract.

The pH of the adhesive formulation is adjusted to a basic pH ranging between approximately 9.0 and 12.0 in order to solubilize the protein. The use of the higher pH values of the above given range tends to increase the ease with which the adhesive can be applied to the base. Also, there is less tendency to foaming when the adhesives are formulated and applied at the higher pH ranges, viz, from 9.6 to 12.0. Therefore, it will usually be desirable to adjust the pH of the aqueous formulation to a pH ranging from 10.0 to 12.0 prior to the time it is to be applied to the wood, paper, or other substrate. This pH adjustment can be accomplished by use of a wide variety of basic substances, e.g., ammonium hydroxide, sodium hydroxide, potassium hydroxide, "Borax," sodium sulfite, sodium carbonate, trisodium phosphate, hydrated lime, sodium metasilicate, sodium fluoride, etc.

In addition to the protein extract adhesive and basic pH control agents, the adhesive formulations usually contain an inert inorganic, insoluble filler material, an anti-foaming agent, and various optional additional materials such as coloring agents, preservatives, etc. Various types of clays can be employed as inert fillers to control viscosity and reduce the amount of adhesive material employed in the formulation. The following clays and other fillers can be listed as exemplary of those which are suitable for use in the adhesive compositions contemplated within this invention: kaolin; calcium carbonate; diatomaceous earth; talc; calcium sulfate; barium sulfate; titanium dioxide; etc. The inert filler can represent from 10 to 50 percent by weight of the total composition. Usually, however, the filler content ranges from about 15 to 40 weight percent and preferably from about 20 to 40 weight percent (based on total solution). Suitable anti-foaming agents which can be used in the adhesive formulations of the present invention include, but are not limited to, the following: tributylphosphate; pine oil; octyl alcohol; soxbitan monolaurate; esters of coconut oil; diglycol laurate; methylpolysiloxanes; diertiaryamylphenoxyethanol; etc. The concentration of anti-foaming agent, when one is employed, can range from 0.1 to 5.0 weight percent and usually ranges from 0.5 to 2.0 weight percent (based on total solution).

The *Micrococcus cerificans* bacterial protein extract adhesive compositions of the present invention can be provided with various coloring agents to enhance their aesthetic appeal. Suitable exemplary coloring agents, pigments, etc., which can be used include, but are not limited to, the following: titanium dioxide; satin white; carbon black; chromium oxide; ultramarine blue, etc. The coloring agent, where one is used, can constitute from 0.1 to 5.0 weight percent of the total adhesive composition, and more usually from about 0.2 to 2.0 weight percent.

In addition to the above mentioned ingredients, the adhesive compositions of the present invention can contain a wide variety of preservative materials, viz., materials employed as bactericides, fungicides, etc. to enhance the storage properties of these compositions and of the coated papers. Suitable exemplary preservatives include, but are not limited to, the following: Borax; sodium orthophenylplenate; ethyl mercury phosphate; chloroacetamide; etc. When a preservative is used, it can be employed in weight concentrations ranging from 0.1 to 5.0 weight percent, and usually from 0.2 to 2.0 weight percent (based on total composition). Usually, the protein extract is stored in the dry state until just prior to its use as an adhesive, at which time it is formulated into the aqueous system.

Representative adhesive batch formulations are tabulated hereinbelow:

| Component | Concentration (Wt. Percent) | |
|---|---|---|
| | Usual | Preferred |
| *Micrococcus cerificans* protein extract | 3–30 | 4–25 |
| Inert filler(s) (clay, etc.) | 15–40 | 20–40 |
| Anti-foaming agent(s) | 0–5 | 0.1–2 |
| Preservative(s) | 0–5 | 0–2 |
| Coloring agent(s) | 0–5 | 0–2 |
| Protein Insolubilizer(s) | ¹ 0–5 | ¹ 0.25–5.0 |
| Carrier (solvent or dispersion medium) | (²) | (²) |

¹ Based on amount of protein extract present.
² Remainder.

| Property | Usual | Preferred |
|---|---|---|
| Total Solids (Wt. percent) | 25–55 | 30–46 |
| pH | 8–13 | 9–12.5 |
| Viscosity * (centipoises per second at 28° C.) | 40–15,000 | 50–10,000 |

* The viscosity reported is that of adhesive solutions (or dispersions) approximately three minutes after preparation and stirring thereof as measured with a Brookfield viscometer using the appropriate spindle, viz., either a No. 2 or No. 3 spindle, at 20 revolutions per minute.

The usual procedure in formulating the adhesive compositions of this invention for use is as follows. First, the *Micrococcus cerificans* protein extract is solubilized by addition of a basic material thereto, e.g. sodium hydroxide solution, to make it more readily soluble in water. Then the solubilized protein extract is added to approximately one-half of the total amount of water to be used (this water already containing the anti-foam agent). The requisite amount of alkali is then added in the remainder of the water until the proper solubility is attained (usual pH of 10–12.5). The desired amount of clay is then added with constant stirring, and the mixture is then heated at 50–60° C. for 10 to 20 minutes and then cooled. The optional preservatives, coloring agents, etc., can be added conveniently along with the clay.

In cases where difficulty is encountered in dissolving (dispersing) the desired amount of clay, a preferred procedure is to add the alkali to the remaining portion of water to pH 12.0 before adding the clay thereto. Then the liquid-clay slip is added slowly to the protein extract solution with steady stirring. The composition is then heated as above.

The adhesive compositions of the present invention spread evenly with no bubbles or lumps apparent in the film.

The present invention will be more clearly understood from a consideration of the following examples.

EXAMPLE 1

| Component: | Concentration (grams per liter) |
|---|---|
| n-Hexadecane | 10.0 |
| $H_3PO_4$ | 5.0 |
| KCl | 1.0 |
| $CaCl_2$ | 0.5 |
| $MgSO_4 \cdot 7 H_2O$ | 0.2 |
| $MnSO_4 \cdot 4 H_2O$ | 0.2 |
| $FeSO_4 \cdot 7 H_2O$ | 0.2 |
| NaCl | 0.2 |
| $NH_4OH$ | (¹) |

¹ Sufficient amount added to maintain pH at approximately 7.0.

*Micrococcus cerificans* bacteria cells were grown on the above listed aqueous inorganic salt medium containing approximately 2 wt. percent of n-hexadecane as the sole source of carbon. The harvested cells were harvested by means of centrifugation, filtered and dried at a temperature of 26° C. for 16 hours (under reduced pressure).

Then the cells were lysed by contact for several hours with an aqueous acetone solution containing 95 wt. percent acetone with the remainder being water. These lysed cells were then dried at a temperature of 26° C. for 16 hours. The dry, lysed cells were then extracted for two hours with 0.15 normal sodium hydroxide aqueous solution. Sufficient sodium hydroxide was employed to maintain the pH above 10.0 with the actual pH range over the two hour period being from 10.0 to 11.0. One third of these cells was retained for adhesive formulation after a single basic extraction as noted above. The remaining two thirds of the cells were again subjected to the same alkali extraction thus yielding doubly extracted cells. Following this the liquid protein extracts, including the singly and doubly extracted samples, were subjected to identical acidification using dilute 5 normal sulfuric acid to a pH of 4.1 to isoelectrically precipitate the extracted protein.

The precipitated protein curd was then collected by centrifugation, washed with water and dried. The yield of bacterial protein extract based on dried *Micrococcus cerificans* cells harvested was 45%. The material obtained by this procedure analyses for 90% pure protein.

The dried protein extract thus obtained was then solubilized by dissolving 9 wt. parts thereof in 84 wt. parts of water and adding sufficient sodium hydroxide (40% aqueous solution) to arrive at a pH of 9.6. The same formulation procedure was employed on both the singly and doubly extracted protein concentrates. The singly extracted protein concentrate having a pH of approximately 9.6 (Adhesive A), and the doubly extracted protein concentrate having a pH of 9.6 (Adhesive B) were formulated as follows for testing in a wood bond strength test.

The adhesive compositions were formulated by adding the protein extract to one half the total amount of water to be used and allowed to soak for 15 minutes. Then the alkali was added in the remainder of the water, and the mixture was stirred at ambient room temperatures (70 to 75° F.) until maximum solubility was attained. The adhesive solutions were then heated at 55° C. (131° F.) for 15 minutes. The adhesive was then set aside to cool gradually to ambient room temperature.

Comparable adhesive compositions were made using casein protein and soy protein (alpha protein) respectively, using essentially the same formulation procedure set forth above. The batch formulas are tabulated hereinbelow.

| | Adhesive A (grams) | Adhesive B* (grams) | Casein (grams) | Soy* (grams) |
|---|---|---|---|---|
| Protein | 10.0 | 10.0 | 10.0 | 10.0 |
| NaOH | 1.1 | 1.1 | 1.1 | 1.1 |
| $Ca(OH)_2$ | 2.0 | 2.5 | 2.0 | 2.5 |
| Water | 25.0 | 30.0 | 25.0 | 30.0 |

*An additional 5 mls. of water and 0.5 gram of water was added (as compared to other adhesive formulations) to reduce viscosity and render adhesive free flowing.

The above adhesive formulations were applied to the grain ends of hard maple blocks cut in 2-inch cubes, the adhesive treated ends were pressed together by hand and air dried for two days. Then the strength of the adhesive bonds was measured on a Scott Tensile Tester having a maximum loading capacity of 400 pounds. The 2-inch maple blocks were inserted in the testing apparatus and the load was applied at right angles to the glue line. All the adhesive bonds supported more than 400 pounds.

The blocks were then cut to provide one (1) square inch of glue line and again subjected to the loading test. The results are tabulated below in Table I.

TABLE I

| Adhesive | Sample | Bond Strength (lbs. per sq. inch) |
|---|---|---|
| A | 1 | >400 |
| | 2 | 380 |
| | 3 | 390 |
| | 4 | >400 |
| B | 1 | 360 |
| | 2 | >400 |
| | 3 | >400 |
| | 4 | >400 |
| Soy | 1 | 330 |
| | 2 | 230 |
| | 3 | 78 |
| | 4 | 120 |
| Casein | 1 | >400 |
| | 2 | 360 |
| | 3 | >400 |
| | 4 | >400 |

The above direct comparison of Adhesives "A" and "B" (prepared using *Micrococcus cerificans* protein extract in accordance with this invention) with commercially used casein and soy adhesives clearly indicates their usefulness as wood adhesives. The superiority of the adhesive compositions of this invention compared to soy protein adhesives is evident.

EXAMPLE 2

Adhesive "A" as prepared from *Micrococcus cerificans* protein extract in accordance with the procedure of Example 1 is formulated into an adhesive suitable for preparation of paper laminates and is then subjected to water resistance testing. The batch formula used is as follows:

| Component: | Parts by weight |
|---|---|
| *Micrococcus cerificans* protein extract | 9.0 |
| Inert filler (kaolin clay) | 75.0 |
| Insolubilizer (formaldehyde) | 0.2 |
| NaOH | 0.75 |
| Water | 120.0 |
| "Borax" | 0.22 |
| Diethyl phthalate | 4.0 |

Several paper laminates are prepared from kraft wrapping paper using Adhesive "A." The *Micrococcus cerificans* protein extract adhesive is formulated by dispersing said protein extract in the sodium hydroxide solution. The

*Micrococcus cerificans* protein extract is added to one half the total amount of water and allowed to soak for 15 minutes. The alkali is then added to the remainder of the water followed by gradual addition of the clay thereto. Then the alkali-clay water portion is added gradually with stirring to the protein extract-water solution and the mixture is heated at 55° C. for 15 minutes. Following cooling and just prior to applications of the adhesive to the kraft paper, the insolubilizer is added to the adhesive with rapid stirring. The adhesive was then applied to the paper and allowed to set. It is observed that the adhesive sets rapidly to an apparently water insoluble state.

The paper laminates are then tested for water resistance by soaking in water for 24 hours. The requirement for water resistant glues used in paper laminates is that the laminates do not separate at the glue line when soaked in water for 24 hours.

After the 24-hour immersion test, no glue line separation occurs in the paper laminates made with the *Micrococcus cerificans* protein extract containing adhesive, thus establishing the water resistance of the adhesives of this invention.

EXAMPLE 3

This test was conducted to determine the adhesive efficiency of casein, soy and *Micrococcus cerificans* protein adhesives as paper coating binders. The binder to pigment ratios of the three adhesives are reported along with their adhesive strengths (on an ascending scale from 1 to 10). The binder pigment ratio is the weight percent of protein adhesive based upon the amount of pigment employed in the batch. The reported data also include the pounds of adhesive which is equivalent to 100 pounds of casein to accomplish the below indicated adhesive strengths. The smaller the equivalent value is, the higher is the adhesive efficiency because less adhesive can be used to accomplish the desired bonding strength. Essentially the same procedure is used to prepare all three formulations which differ only in the adhesive used and the binder to pigment (kaolin clay) ratio.

TABLE II

| Binder | Binder Pigment Ratio (percent) | Adhesive Strength | Pounds of Binder, Equivalent to 100 lbs. Casein |
|---|---|---|---|
| Casein | 18.0 | 7 | 100.0 |
| Soy | 18.0 | 6 | 100.0 |
| *Micrococcus cerificans* protein extract | 15.0 | 7 | 83.5 |

These fiindings indicate that the adhesive containing *Micrococcus cerificans* protein extract as the binder is approximately equal in adhesive strength at a 15% binder level to the commercial casein protein at an 18% binder level and superior to the commercial soy protein at an 18% binder level. In other words, approximately 84 pounds of *Micrococcus cerificans* protein extract can be used to accomplish the equivalent adhesive task requiring 100 pounds of casein adhesive and more than 100 pounds of soy adhesive. This adhesive efficiency is an economically significant and important advantage of the present invention.

EXAMPLE 4

Comparative tests were conducted on commercial casein, commercial soy and *Micrococcus cerificans* protein extract based aqueous adhesive compositions to evaluate their effectiveness as paper coatings using wax pick tests. The wax pick tests are perhaps the most significant tests to which paper coating adhesives are subjected insofar as evaluating the effectiveness of the adhesives as a binder for the pigments (clays) and for holding the coating onto the paper. These tests are used widely throughout the paper coating industry and are described as standard methods in Tappi Standards T402M-49. The pick tests were made using the Dennison standard paper testing waxes. These tests provide an estimation of the ease with which a coating can be removed or "picked" from the paper bodystock, and the tendency of the bodystock to split. A "slight pick" describes the removal of a portion of the coating or a rupture between bonded clay particles. A "complete pick" indicates that the coating has separated completely from the paper (low adhesive strength coating). A "bodystock split" occurs when the adhesive bond between the coating and the paper is stronger than the bonds between the paper fibers causing a rupture within the paper.

The series of paper testing waxes have graded adhesive powers running from 2A, which have the least adhesive strength, to 26A, which has the greatest adhesive strength. The end of the wax stick is heated to its melting point and pressed onto the surface of the paper coating. When it has cooled, the wax is removed with a quick vertical jerk. Both the end of the wax stick and the paper are inspected closely to determine the type of rupture created. The Critical Wax Number is the highest wax number which will not disturb the surface of the coating. It is generally found that a satisfactory coated paper for direct printing has a grading within the range of wax numbers from 3A to 8A, and for offset printing within a range of 5A to 10A.

The coatings were applied to duplicating paper which represents an uncoated bodystock. A doctor blade was used to draw down films approximately 0.0015 inch thick. The films were dried at 160° F. for three minutes and then air dried for three days prior to testing.

The batch compositions of the adhesive formulations are as follows for the 12%, 15% and 18% adhesive formulations tested (adhesive content as a weight percent adhesive based on amount of clay present) for Critical Wax Number (Table 3B below).

|  | 12% Adhesive | 15% Adhesive | 18% Adhesive |
|---|---|---|---|
| Adhesive, (³) grams | 9.0 | 9.0 | 9.0 |
| Anti-Foam Agent, (¹) mls | 2.0 | 2.0 | 2.0 |
| Inert Filler, (²) grams | 75.0 | 60.0 | 50.0 |
| Water, mls | 121.0 | 98.0 | 84.0 |
| Total Weight, grams | 207.0 | 169.0 | 145.0 |
| Total Solids (Wt. percent) | 40.5 | 40.5 | 40.5 |

¹ Tributyl phosphate was used as the anti-foam agent.
² Kaolin clay was used as the inert filler.
³ The soy protein used was "Alpha Protein" supplied by Central Soya. The casein protein used was that mentioned by E. Sutermeister et al. in "Casein and Its Industrial Applications," 1936. The *Micrococcus cerificans* protein extracts used were Adhesive A and Adhesive B o Example 1. Adhesive B' contains *Micrococcus Cerificans* protein extract grown, harvested, lysed, extracted and precipitated as in Example 1, but formulated according to the procedure of Example 2. The physical properties of typical samples of the protein adhesive tested are given below.

| Protein Adhesive | Moisture, Percent | Alkali Requirement (mls. of 0.1 N NaOH) (per gram) | Color | Solubility in 0.1 N NaOH |
|---|---|---|---|---|
| Casein | 9.63 | 11.2 | Yellow | Complete. |
| Alpha Protein | 8.80 | 10.1 | do | Do. |
| Adhesive A | 9.93 | 10.1 | Tan | Partial. |
| Adhesive B | 15.20 | 15.6 | Yellow | Complete. |
| Adhesive B' | 3.48 | 14.5 | Tan | Do. |

The casein, alpha protein (soy), Adhesive A and Adhesive B adhesives were formulated into 12%, 15% and 18% compositions in accordance with the formulation procedure set forth above in Example 1. The 12%, 15% and 18% compositions containing Adhesive B' were formulated using the formulation procedure of Example 2 (without the insolubilizer, of course).

The batch composition of the adhesive coating formulations prepared for determining the Wax Number at which "slight pick," "complete pick" and "bodystock split" occurs in a 12% adhesive (based on amount of inert filler present) having the below batch formula.

| Component: | Amount |
|---|---|
| NaOH | grams 0.30 |
| NH₄OH | do 0.45 |
| Borax | do 0.22 |
| Diethyl phthalate (anti-foam agent) | do 4.0 |
| Water | ml 120.0 |
| Kaolin clay | grams 75.0 |
| Adhesive | do 9.0 |

The first five components were first mixed and then the clay was dispersed and stirred for five minutes. Then the respective protein adhesive was added to the clay dispersion and heated at 55° C. for 15 minutes.

Table 3A below indicates the Wax Number at which "slight pick," "complete pick" and "bodystock split" occurred.

Table 3B below indicates the Critical Wax Number for the various adhesives tested.

TABLE 3A

| Adhesive | Paper Coating | | |
|---|---|---|---|
| | Wax number at Complete Pick | Wax number at Slight Pick | Wax number at Bodystock Split |
| Casein | 4,5 | 3 | None |
| Alpha Protein (Soy) | 4,5 | 3 | None |
| Adhesive A | 3,4 | <3 | None |
| Adhesive B | None | 3 | *4,6 |

*This indicates stronger adhesion between the coating and paper than between paper fibers. Only a very strong adhesive can cause bodystock split.

TABLE 3B

| Adhesive | Critical Wax Number for Given Percent Adhesive* | | |
|---|---|---|---|
| | 12 Percent Adhesive | 15 Percent Adhesive | 18 Percent Adhesive |
| Casein | <3 | 6 | 7 |
| Alpha Protein (Soy) | <3 | 5 | 6 |
| Adhesive A | <3 | <3 | 6 |
| Adhesive B | <3 | 5 | 7 |
| Adhesive B' | 4 | 7 | 8 |

* Wt. percent adhesive based on amount of clay present.

As noted hereinabove, the Critical Wax Number is a measure of the adhesive strength of the binder (the higher the Critical Wax Number the greater the strength).

Adhesive A is singly extracted whereas Adhesives B and B' are double extracted. Adhesive B' is formulated to reduce foaming.

EXAMPLE 5

Comparative wax pick tests were conducted to determine the influence of calendering on casein paper coating adhesives and paper coating adhesives containing *Micrococcus cerificans* protein extract in various adhesive concentrations (wt. percent adhesive based on amount of clay present).

The coated papers were effectively calendered by wrapping the wet coated papers around a highly polished chromium plated calendaring roll and drying at 160° F. for 15–30 minutes to form smooth, glossy surfaces. Calendered papers are used widely in the glossy and colorful advertisements of magazines.

Calendering tends to embrittle coatings and reduce adhesion of the coating if the adhesive binder used is lacking in the proper plasticity. Casein adhesives demonstrate good plasticity and are probably at present the best low-cost protein-based commercial paper coatings available in the prior art for use in paper calendering operations due to retention of adhesive power after calendering. Calendering casein coatings reduces the adhesive strength by only about one wax number.

The pertinent data are reproduced below in Table 4.

TABLE 4.—WAX PICK TESTS ON CALENDERED AND UNCALENDERED COATINGS

| Adhesive | Critical Wax Number for Given Percent Adhesive | | | | |
|---|---|---|---|---|---|
| | 15% | 16% | 16.5% | 17% | 18% |
| Casein: | | | | | |
| Uncalendered | 6 | | | | 8 |
| Calendered | 5 | | | | 7 |
| Adhesive B: | | | | | |
| Uncalendered | | 5 | 6 | 7 | 7 |
| Calendered | | 4 | 4 | 7 | 6 |

The above data clearly indicate that the paper coating adhesives of this invention containing *Micrococcus cerificans* protein extract compare very favorably with commercial casein adhesives due to their ability to retain adhesive strength upon calendering. The average loss of only one wax number is quite similar to casein in its excellent plasticity. Moreover, in certain formulations, e.g., at 17% adhesive, the *Micrococcus cerificans* protein extract based adhesives of this invention appear to be superior in retention of adhesive strength.

EXAMPLE 6

Brightness, gloss (specular gloss) and opacity tests were conducted on uncoated paper, and paper coated with adhesives containing *Micrococcus cerificans* protein extract and casein, respectively, using 12% adhesive solutions (based on amount of clay present).

The brightness of paper coatings is a measure of the whiteness or the total amount of diffuse light reflected from the coating surface.

Specular gloss is widely used as a partial measure of the surface quality and shiny appearance of paper. It is the geometrically selective reflectance of a surface, which accounts for its lustrous appearance. The specular gloss was measured according to ASTM Designation: D1223–52T.

Opacity was measured according to ASTM Designation: D589–44.

A photoelectric reflection meter, "Model 610" (The Photovolt Corporation), equipped with two search units was used to measure the above three optical properties of the coatings. The search unit used to measure specular gloss incorporates an angle of 60° for incident light as well as reflected light. The unit used to determine brightness and opacity was equipped with a tristimulus green filter and measures only diffuse reflection.

The same formulation procedure was used to prepare all coatings. The compositions differed only in the type of protein adhesive present.

The pertinent data secured from these optical properties evaluation tests are presented below in Table 5.

TABLE V

| Coating | Brightness | Gloss | Opacity, Percent |
|---|---|---|---|
| None | 78.5 | 6.5 | 96.1 |
| Adhesive A* | 80.0 | 13.5 | 99.4 |
| Adhesive B* | 80.5 | 13.5 | 100.0 |
| Alpha Protein (Soy) | 80.0 | 12.5 | 99.4 |
| Casein | 81.0 | 12.5 | 100.0 |

*Contain *Micrococcus cerificans* protein extract.

It is clearly apparent from the data above that the adhesive compositions of this invention are useful in improving the optical properties and surface quality of paper. In fact the binder coatings of the present invention are considered to compare quite favorably with the commercial binders, soy and casein, currently in common use in all three essential optical properties.

EXAMPLE 7

Warth incubation tests were conducted on casein, soy and the *Micrococcus cerificans* protein extract adhesives of this invention as exemplified by Adhesive A to determine their storage properties. The Warth incubation test is described by E. Sutermeister et al. in "Casein and Its Industrial Applications," second edition (1939).

Five grams of sample are placed in a 500 ml., sterile, broad-bottom flask equipped with a sterile cotton plug. Thirty mls. of sterile water are added without mixing, and the flask is incubated at 37.5° C. The samples are checked at the appropriate time intervals noted below. A product having good storage properties will stand up well for at least 48 hours without showing signs of marked decomposition. The pertinent data are presented in Table 6 below.

TABLE 6

| Sample | 24 Hours | 48 Hours |
| --- | --- | --- |
| Casein | Faint, sour odor | Putrid odor, mold present. |
| Adhesive A | No change | Faint odor. |
| Alpha Protein (Soy) | do | No Change. |

While the above examples illustrate the present invention in great detail, it should be clearly understood that the present invention, in its broadest aspects is not limited to the specific formulation procedures and *Micrococcus cerificans* protein extract concentrations set forth in the examples.

While formaldehyde has been employed in an above example as an insolubilizer for the *Micrococcus cerificans* protein extract, it should be realized that any protein insolubilizer can be used in weight concentrations ranging from about 0.25 to 5.0 weight percent (based on the amount of *Micrococcus cerificans* protein extract present). Other suitable, exemplary insolubilizers which can be employed include, but are not limited to, the following: dimethylol urea (and other formaldehyde yielding materials); hexamethylene tetramine; glyoxal; aluminum sulfate; zinc sulfate (used as the ammonia complex); etc.

The *Micrococcus cerificans* protein extract containing adhesives and paper coating binders of the present invention possess an excellent over-all balance or composite of highly desired properties, including high adhesive strength; good paper coating characteristics; excellent plasticity and adhesive power retention for processing, e.g. calendering operations; good optical properties; water resistance, good storage properties; etc. Moreover, the present invention offers uniformity in these properties since genetic stability studies firmly establish that the microorganism, *Micrococcus cerificans*, from which the protein extract is obtained has been genetically stable through several hundred generations.

The uses of the *Micrococcus cerificans* protein extract containing adhesive and coating compositions of this invention are widespread and include, but are not limited to, the following: paper coating binder; wood adhesive; water resistant paper laminating adhesives; binder in water-based paints; coating for washable wallpapers; binder in wet strength paper applications, e.g., paper toweling, paper board, box board, etc.

What is claimed is:

1. A proteinaceous adhesive composition comprising *Micrococcus cerificans* protein extract and water.

2. A proteinaceous paper coating binder composition comprising water, an inert filler and *Micrococcus cerificans* protein extract having a pH of about 8 to 13.

3. A composition as in claim 2 which includes an insolubilizer for said protein extract.

4. A composition as in claim 1 which includes an antifoam agent.

5. A proteinaceous adhesive composition comprising 3 to 30 weight percent *Micrococcus cerificans* protein extract, 15 to 40 weight percent inert filler, 0 to 5 weight percent anti-foaming agent, 0 to 5 weight percent preservative, and from about 72% to about 20% by weight of water, said composition having a pH of about 8 to 13 and containing from about 25 to 55 weight percent total solids, and having a viscosity at 28° C. ranging from about 40 to 15,000 centipoises per second.

6. A composition as in claim 5 which includes from about 0.25 to 5.0 weight percent of an insolubilizer for said protein extract, based on the amount of protein extract present.

7. A method of producing a proteinaceous adhesive paper coating composition which comprises lysing harvested *Micrococcus cerificans* cells, conducting a basic extraction on said lysed cells at a pH ranging from 8 to 12 to obtain *Micrococcus cerificans* protein extract, precipitating said extract at an acid pH ranging from 5.2 to 3.2, mixing said protein extract with water at a basic pH ranging from 8 to 13, separately mixing an inert filler with an additional amount of water at a pH ranging from 10 to 12.5 and then mixing the separately prepared protein extract water mixture and inert filler-water mixture.

8. A method as in claim 7 wherein the carrier to which the inert filler is added is adjusted to a pH ranging from 10 to 12.5 before addition of the inert filler thereto.

9. A method as in claim 8 wherein said inert filler-carrier mixture is added gradually to said protein extract water mixture.

10. A method as in claim 7 wherein a protein insolubilizer is added to the mixture obtained after mixing said protein extract-carrier and inert filler-water mixtures.

11. A method as in claim 7 wherein said water to which said protein extract is added contains an anti-foam agent.

No references cited.

ALEXANDER H. BRODMERKEL, *Primary Examiner.*

T. MORRIS, *Assistant Examiner.*